(12) United States Patent (10) Patent No.: US 7,879,758 B2
Heidenreich et al. (45) Date of Patent: Feb. 1, 2011

(54) CATALYTICALLY ACTIVE POROUS ELEMENT

(75) Inventors: Steffen Heidenreich, Stimpfach (DE); Manfred Nacken, Ilshofen (DE)

(73) Assignee: Pall Corporation, Port Washington, NY (US)

( * ) Notice: Subject to any disclaimer, the term of this patent is extended or adjusted under 35 U.S.C. 154(b) by 321 days.

(21) Appl. No.: 11/576,049

(22) PCT Filed: Jul. 5, 2005

(86) PCT No.: PCT/EP2005/007234

§ 371 (c)(1), (2), (4) Date: Mar. 27, 2007

(87) PCT Pub. No.: WO2006/037387

PCT Pub. Date: Apr. 13, 2006

(65) Prior Publication Data

US 2007/0264181 A1 Nov. 15, 2007

Related U.S. Application Data

(60) Provisional application No. 60/614,038, filed on Sep. 30, 2004.

(51) Int. Cl.
| B01J 21/06 | (2006.01) |
| B01J 23/22 | (2006.01) |
| B01J 23/28 | (2006.01) |
| B01J 23/34 | (2006.01) |

(52) U.S. Cl. .................. 502/350; 502/309; 502/312; 502/321; 502/324; 502/353; 502/527.12; 502/527.14; 502/527.15; 423/239.1; 423/245.3; 95/285

(58) Field of Classification Search ............ 502/527.12, 502/524.14, 527.15, 309, 321, 312, 350, 502/324, 353, 527.14; 95/285; 423/239.1, 423/245.3
See application file for complete search history.

(56) References Cited

U.S. PATENT DOCUMENTS

| 5,036,037 | A | 7/1991 | Kladnig et al. |
| 5,371,056 | A | 12/1994 | Leyrer et al. |
| 5,885,923 | A | 3/1999 | Yoshida et al. |
| 6,331,351 | B1 * | 12/2001 | Waters et al. ............ 428/317.7 |
| 2003/0236163 | A1 | 12/2003 | Chaturvedi et al. |

FOREIGN PATENT DOCUMENTS

| EP | 0 345 695 | 12/1989 |
| JP | 2-160047 | 6/1990 |
| JP | 02-160047 | 6/1990 |
| WO | WO 98/03249 | 1/1998 |

* cited by examiner

*Primary Examiner*—Timothy C Vanoy
*Assistant Examiner*—Diana J Liao
(74) *Attorney, Agent, or Firm*—Leydig, Voit & Mayer, Ltd.

(57) ABSTRACT

A catalytically active porous element for promoting catalytic gas phase reactions is proposed, said element comprising a porous structural element of sintered ceramic or metallic primary particles, which are selected from fibrous and/or granular particles, a secondary structure of titania nano particles deposited on the surface of said sintered primary particles and a catalytic component deposited on the surface of the titania nano particles. Thereby porous catalytic elements for catalytic gas phase reactions which are useful not only in $NO_X$ reduction reactions but also for other catalytic gas phase reactions are provided.

27 Claims, 3 Drawing Sheets

CATALYTICALLY ACTIVE POROUS ELEMENT

Figure 1:
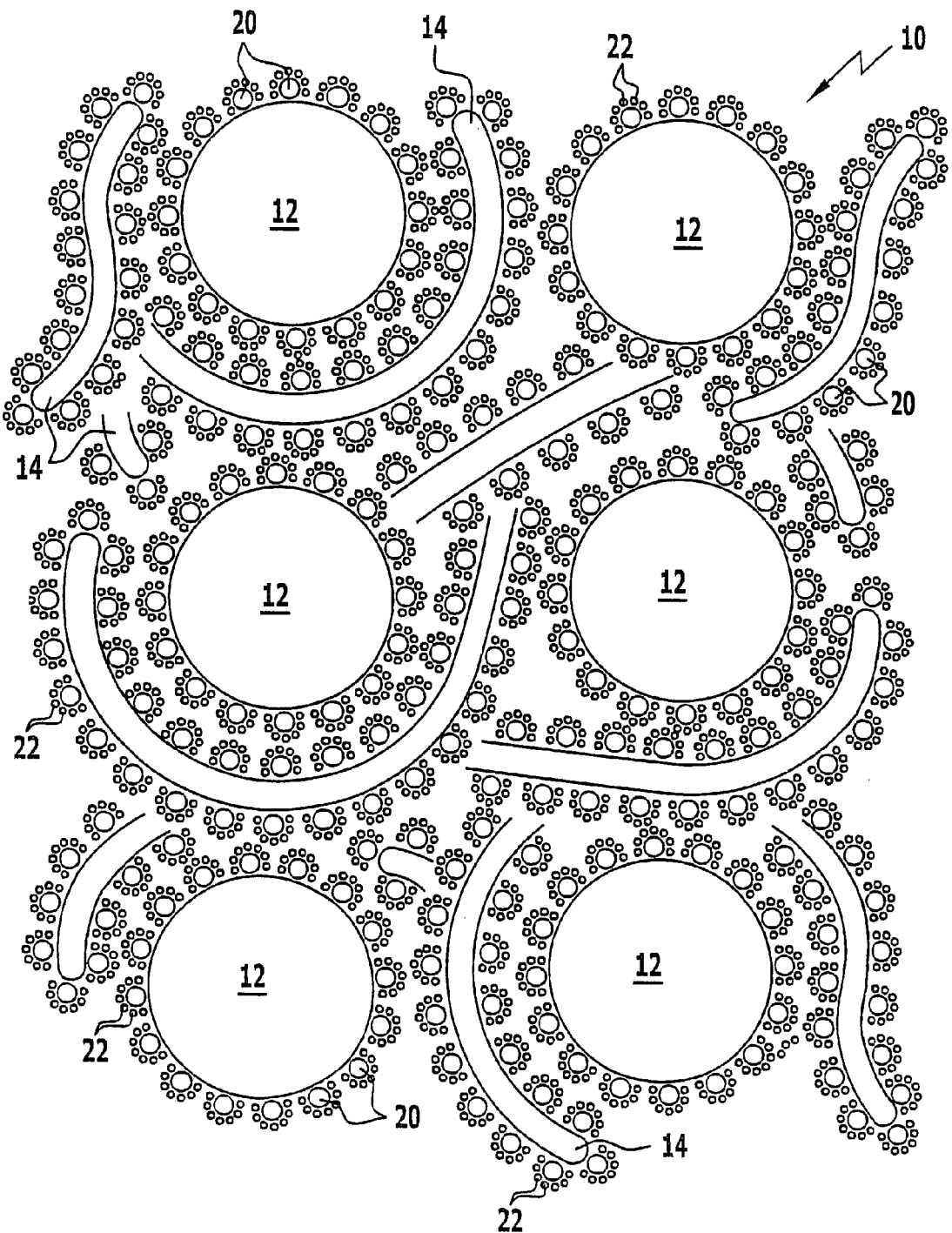

The present invention relates to a catalytically active porous element for promoting catalytic gas phase reactions. More specifically, the invention relates to porous catalytic elements for use in redox and oxidation reactions.

One important field for the use of the catalytic active porous elements is the selective catalytic reduction (SCR) of NOx. Another important field of the inventive porous catalytic elements is the catalytic oxidation of volatile organic compounds (VOC). Moreover, the porous catalytic elements of the present invention may be used to simultaneously reduce the NOx content in a gas phase as well as catalytically oxidize VOC.

Furthermore, the porous catalytic element may be provided with a filter layer, so that the porous catalytic elements can be used in combination for filtration and catalytic gas phase reactions.

WO 98/03249 discloses flue gas cleaning devices with catalytic ceramic filters of various densities and porous filter structures. The porous filter structure forms passages for flue gas between an upstream side and a downstream side of the cleaning device and has a catalyst material bonded to the surface of such passages by means of a binder.

The ceramic filter elements disclosed in this reference have the drawback that the NOx reduction effect with such filter elements becomes small at a higher flow rate of the gas. NOx removal efficiency drops to 25% or less at flow rates of 2.0 cm/s and NOx feed concentrations of 400 ppm. Furthermore, the operating temperatures required are 340 to 400° C.

The object of the present invention resides in providing porous catalytic elements for catalytic gas phase reactions which are useful not only in NOx reduction reactions but also for other catalytic gas phase reactions, especially catalytic oxidation of VOC. Furthermore, the invention is to provide such porous catalytic elements with improved efficiency for the gas phase reactions.

The object of the present invention is achieved in that the catalytically active porous elements comprise a porous structural element of sintered ceramic or metallic primary particles which are selected from fibers and/or granular particles, a secondary structure of titania nano particles deposited on the surface of said sintered primary particles and a catalytic component deposited on the surface of the titania nano particles.

The term "titania nano particles" as used in the context of the present invention denotes particles of particle sizes of up to 1000 nm. The lower limit of the particle sizes of titania nano particles is not critical, but for practical reasons usually nano particles of titania of a diameter of 5 nm or more are used.

The present invention achieves NOx removal efficiencies of over 70% under conditions comparable to WO 98/03249 even at higher NOx feed concentrations (e.g., 500 ppm) and at lower temperatures (e.g., 300° C.).

Ideally, the surface of the primary particles accessible in the porous structural element is completely covered by titania nano particles. In practice, a coverage of a substantial portion of the accessible surface of the sintered primary particles will already provide good results.

The catalytically active porous element may have a variety of forms.

In one typical embodiment, the catalytically active porous element is provided in the form of a plate.

Another typical embodiment provides the catalytically active porous element in tubular form. The tubular element may be open at both ends or alternatively closed by an end wall at one end as known from so-called filter candles.

For specific embodiments, where the gas phase reaction is to be combined with a filtering process, the porous element according to the present invention is provided with an upstream and a downstream surface, said upstream surface carrying a filter layer. The filter layer may be a membrane-type filter layer.

The filter layer may serve filtration purposes and/or to protect the porous structural element from particles contained in the gas phase passing through the catalytically active porous element.

In certain embodiments, the catalytically active porous element can be used in the form of filter plates. In other embodiments where the catalytically active porous element in tubular form is provided with a filter layer on the upstream surface thereof, the upstream side may be the outer or the inner surface of the tubular structure.

When a filter layer is used on the upstream side of the porous structural element, such filter layer is preferably essentially free from titania nano particles. This means that the titania nano particles are preferably deposited in the porous structural element of sintered primary particles only. However, a deposit of the titania nano particles in the transitional zone between the sintered primary particles and the filter layer usually does not cause noticeable detrimental effects.

The filter layer being essentially free from titania nano particles, leaves the filter layer in its filter characteristics essentially unchanged. The filter layer is usually of a thickness which is much smaller than the thickness of the underlying porous structural element of sintered primary particles in order to minimize pressure drop across the catalytically active filter element as a whole.

A very good compromise between a filter layer being essentially free from titania nano particles and less stringent or critical manufacturing parameters allows a deposit of titania nano particles in parts of the filter layer, especially in a transitional zone of the filter layer to the sintered primary particles. However, the deposit of titania nano particles should be avoided in at least half of the average thickness of the filter layer at the upstream side, whereas a deposit of some of the titania nano particles within said transitional zone of the filter layer and sintered primary particles is less critical. In such cases, often an increase in pressure drop across the filter layer is found to be acceptable for the catalytic reactions to be performed.

The amount of titania nano particles deposited on said sintered primary particles ranges from 0.1 to 20% by weight, based on the weight of the sintered primary particles. The actual amount of titania nano particles which can be deposited on the sintered primary particles depends on the primary structure of the porous structural element, i.e., the voids volume and surface available which differ depending on the use of granular and/or fibrous primary particles when forming the porous structural element and on the size and size distribution of the primary particles used. It further depends on the size of the titania nano particles, i.e., the amount in % by weight which can be deposited increases with decreasing size of the titania nano particles for a given size of primary particles.

Where the porous structural element is essentially comprised of sintered granular primary particles, the amount of titania nano particles preferably ranges from 0.1 to 10% by weight, based on the weight of the sintered primary particles.

Where the porous structural element is comprised of sintered granular as well as fibrous primary particles, the amount of titania nano particles which can be deposited on the surface of the sintered primary particles ranges preferably from 0.1 to 15% by weight, based on the weight of the sintered primary particles.

Where the porous structural element is essentially comprised of sintered fibrous primary particles only, the amount of titania nano particles may preferably range from 0.1 to 20% by weight, based on the weight of the sintered primary particles.

The variation of the ratio of the amounts by weight of fibrous and granular primary particles allows for an adaptation of the basic structure of the porous structural element to various specific applications.

The catalytic component deposited on the surface of the titania nano particles often comprises vanadic oxide.

Preferably, the vanadic oxide is deposited on the titania nano particles in the form of clusters and/or nano particles, whereas the term "cluster-" denotes monomolecular, oligomeric, polymeric or crystalline species forming monolayers, multilayers, aggregated molecules or crystallites, providing for high specific surface of the catalytic material itself.

The amount of vanadic oxide clusters and/or nano particles deposited ranges from 0.01 to 10% by weight, based on the weight of the primary sintered particles.

The vanadic oxide nano particles may range from 1 nm up to one half of the average particle size of the titania nano particles.

Specific catalytic components comprise manganese oxide besides or independently of the presence of vanadic oxide, and this catalytic component is also preferably deposited in the form of clusters and/or nano particles.

The definition given for the clusters in connection with vanadic oxide material also applies here.

The amount of manganese oxide clusters and/or particles preferably ranges from 0.001 to 6% by weight, based on the weight of the primary sintered particles.

Likewise, the average size of the manganese oxide particles when used as nano particles ranges from 1 nm up to one half of the average particle size of the titania nano particles.

In another specific embodiment, the catalytic component comprises in addition to vanadic oxide clusters and/or nano particles, clusters and/or nano particles of tungsten oxide and/or molybdenum oxide. The above given definition for the term "cluster" also applies here.

The amount of tungsten and molybdenum oxide clusters and/or nano particles ranges independently of one another from 0.05 to 20% by weight, based on the weight of the sintered primary particles, depending on the proposed use for the catalytically active porous element.

In addition to the aforementioned catalytic compounds, the catalytic component may comprise one or more precious metals in elementary form. Preferably, the precious metal(s) is (are) chemically deposited on the titania nano particle loaded primary sintered particles.

The average size of the granular primary particles for manufacturing the porous structural element preferably ranges from 40 to 400 μm. These particle sizes allow for building up of a sufficient porosity or voids volume in the structural element and at the same time ensure sufficient stability of the sintered structure.

The fibrous primary particles preferably have an average diameter of from 10 to 400 μm and an average length of from 1 to 20 mm, independently of whether they are used together with granular primary particles or used alone to build the porous structural element.

When granular primary particles are used in combination with fibrous primary particles, the range of primary granular particles used is from 40 to 90% by weight, whereas the amount of fibrous primary particles ranges from 10 to 60% by weight, both based on the weight of the total amount of primary particles.

The binding of the titania nano particles to the primary particles is preferably achieved by a thermal or sintering process. Such binding technique avoids the use of an additional binder material.

It is likewise preferred to bind the catalytic component to the titania nano particles by way of a thermal process.

When a filter layer is used in a catalytically active porous element of the present invention, the filter layer is preferably made of ceramic or metallic particles. The filter layer may be sintered on the upstream surface of the porous structural element. The filter layer usually has a smaller pore size than the structural element of sintered primary particles so as to protect the underlying structural element from impinging particulate matter contained in the gas phase to be treated.

As mentioned above, a preferable form of the catalytically active porous element is a tubular structure which is usually closed at one end thereof.

One preferred use of the porous element according to the present invention, is for NOx removal from a gas stream by selective catalytic reduction of the NOx.

Another preferred use is removal of VOC from a gas phase by an oxidation reaction.

Another use of the inventive porous elements is to treat a gas stream comprising volatile organic compounds (VOC) and at the same time remove NOx from the gas stream by simultaneous catalytic conversion.

Subject of the present invention is, furthermore, a method for manufacturing catalytically active porous elements as described above and such manufacturing method comprises the steps of:

providing a porous structural element having a filter layer on the upstream surface of the structural element;

impregnating and coating the filter layer with a removable protecting agent, thereby forming a protective layer blocking the pores of the filter layer;

depositing titania nano particles on the sintered primary particles of the structural element;

depositing the catalytic component on the surface of the titania nano particles; and removing the protecting agent from the filter layer.

In a more specific embodiment of the inventive method for manufacturing the catalytically active porous element, depositing of the catalytic component comprises impregnating the structural element having titania nano particles deposited on the surface of the sintered primary particles with a solution of a precursor of catalytic clusters and/or nano particles, a sol or a suspension comprising catalytic clusters and/or nano particles, drying and thermally treating the impregnated element, thereby removing solvent of the precursor solution, the sol or the suspension and removing the protecting agent by evaporating and/or burning the same.

The studies of the present inventors revealed that a simple drying step following the deposit of the titania nano particles leaving the protective layer unaffected is sufficient to prepare the porous element for depositing the catalytic component.

Indeed, it is preferable not to sinter the titania nano particles on the primary sintered particles but to defer same until the catalytic component has been deposited too.

Thus, it is not necessary to apply the protective layer a second time to avoid deposition of the catalytic component in the filter layer.

Another interesting aspect of the present invention resides in the fact that a still further improved catalytic activity is found, when, after the impregnation with the catalytic component or its precursor, a drying step is carried out which does not remove all of the solvent from the porous element but leaves a substantial portion of it in the pores. The still partially wet porous element is then subjected to the thermal treatment for removing the protective layer. During this thermal treatment the catalytic component is formed from its precursor, if a precursor was used in the impregnation step, the deposited titania nano particles are sintered and the catalytic component is bound on to on the sintered primary particles.

Further advantages and aspects of the present invention are described in connection with the drawing and the following Examples.

Figure 2:
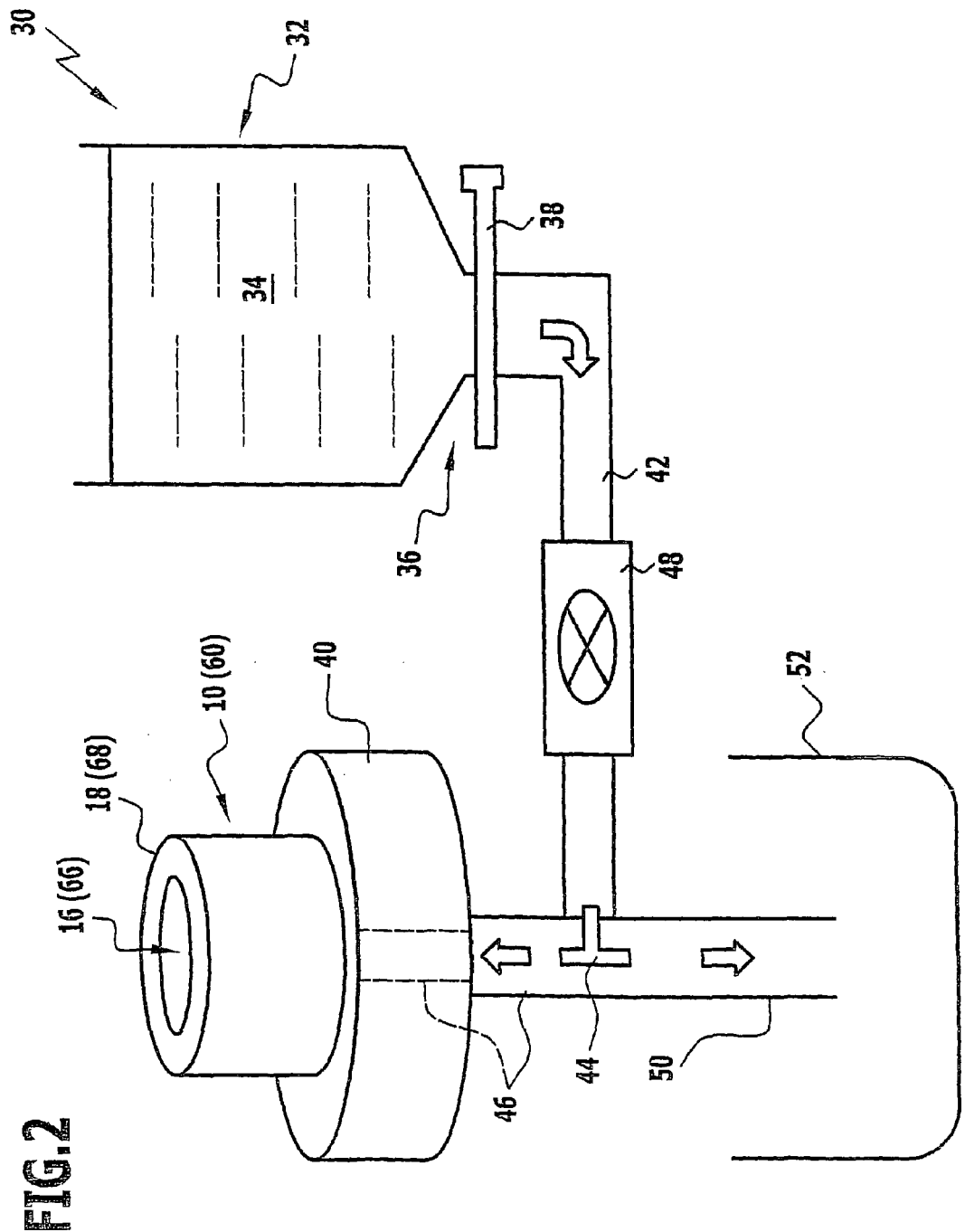
Figure 3:
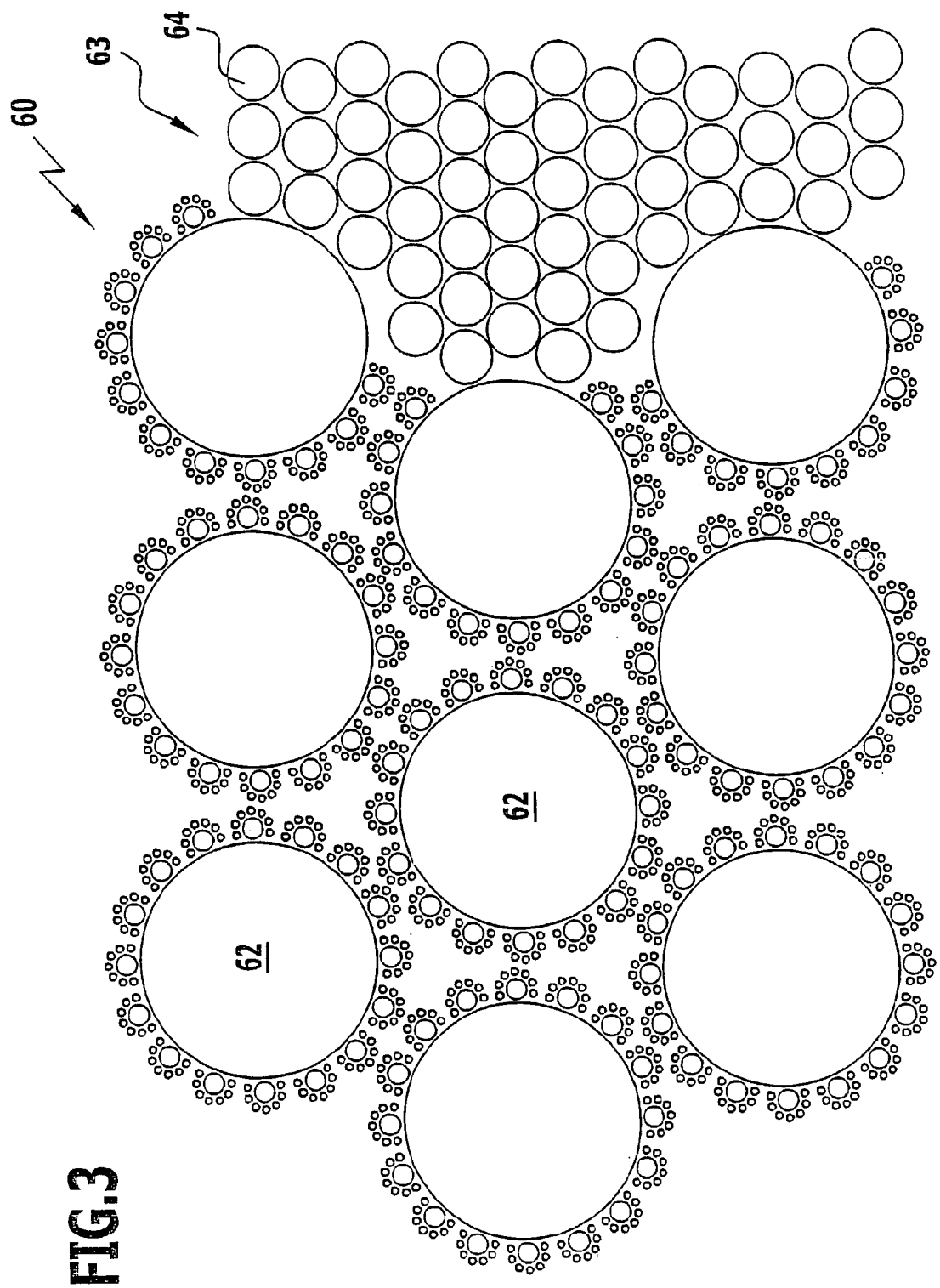

In the drawing:

FIG. 1: shows a schematic representation of a first catalytically porous element according to the present invention;

FIG. 2: shows a schematic representation of a device for impregnating porous structural elements; and FIG. 3: shows a schematic representation of a second catalytically active porous element according to the present invention.

EXAMPLE 1

In this Example, a catalytically active porous element 10 based on a porous structural element of sintered ceramic primary particles as schematically represented in FIG. 1 was manufactured. The porous structural element consisted of SiC grains 12 and $Al_2O_3$ fibers 14 as primary particles. The ratio by weight of the SiC grains 12 to the $Al_2O_3$ fibers 14 was approximately 4.5. The average particle size of the SiC grains 12 was 160 μm, and the average dimensions of the $Al_2O_3$ fibers 14 were: average diameter 0.3 mm and average length 3 mm. These primary particles were thoroughly mixed and sintered to form a tubular structure with an outer diameter of 60 mm, an inner diameter of 40 mm and a length of 50 mm.

The outer surface of the tubular element was used as the upstream surface and was provided with a membrane filter layer. This filter layer had a thickness of approximately 200 μm on average and consisted of sintered mullite particles of an average particle size of 40 μm (for reasons of simplicity, the filter layer is not shown in FIG. 1). The pore size of the filter layer was approximately 10 μm.

Such porous structural elements are commercially available as DIA-SCHUMACEL HT 10 from PALL Schumacher GmbH, Germany.

In a first step the membrane filter layer was provided with a protective layer of commercially available paraffin wax with a melting point of 51 to 53° C. The paraffin wax was used in liquid form for impregnating and coating the membrane filter layer while care was taken to ensure that the upstream surface of the membrane filter layer was completely covered by the paraffin wax and the filter layer itself was penetrated by the paraffin wax to an extent of at least 50% of the average thickness of the filter layer.

For impregnating the porous structural element 10 a device 30 was used as schematically shown in FIG. 2. The device 30 comprises a container 32 for holding a suspension, sol or solution (liquid 34) to be used for impregnating the porous structural element 10. The liquid 34 may be withdrawn from the container 32 via a bottom outlet 36 including valve 38. The bottom outlet 36 is connected with a rubber hopper 40 via conduit 42, a three-way valve 44 and an upright positioned tube 46. The conduit 42 includes a pump 48 to feed liquid 34 to the tube 46 and the rubber hopper 40.

The rubber hopper 40 serves to receive one end of the tubular porous structural element 10 as shown in FIG. 2. Once the element 10 has been properly placed on rubber hopper 40, the three-way valve 44 is set to connect conduit 42 and tube 46. Valve 38 is opened and pump 48 is operated to feed liquid 34 through conduit 42, three-way valve 44 and tube 46 to the rubber hopper 40 and into the interior space 16 of element 10 until the level of liquid 34 rises up to the upper (open) end 18 of element 10. The liquid 34 is hold within the interior 16 of element 10 for a certain period of time to allow liquid 34 to penetrate into all of the voids volume of element 10. Thereafter, the three-way valve 44 is operated to allow the liquid 34 within the interior 16 of element 10 to be drained via tube 46 and a further tube 50 into a receptacle 52 collecting the used liquid 34.

This sequence will be used for all desired components, including the precursor liquids of the catalytic components.

For the preparation of the $TiO_2$ nano particle suspension 11 g of a grain fraction of commercial available $TiO_2$ powder (agglomerations of titania nano particles; size of agglomerates ranging from 63 to 80 μm; average titania nano particle size 21 nm; BET surface of 50 $m^2/g$) was dispersed in 147.2 g pure 2-propanol, followed by the addition of 4 g 96% acetic acid and 15 min ultrasonic treatment to break down the agglomerates into individual nano particles and uniformly disperse the titania nano particles in the liquid phase.

The tubular filter element 10 protected on its upstream (outer) surface by the paraffin protecting layer was mounted with one of its open ends on the rubber hopper 40 to allow the freshly prepared $TiO_2$ suspension to be pumped through the hopper 40 into the interior 16 of the tubular element 10 for wetting the porous structure of sintered primary particles completely with the $TiO_2$ suspension (liquid 34). Thereafter, the suspension was kept for 3 sec in the interior 16 of the tubular filter element 10. Subsequently, the remaining suspension was drained.

The $TiO_2$ impregnated filter element 10 was dried while horizontally rotating same and using an air stream to obtain a $TiO_2$ nano particle 20 coated tubular filter element 10. The temperature during the drying step was kept at ambient temperature. The amount of $TiO_2$ nano particles 20 deposited on the sintered primary particles 12, 14 of the porous structural element 10 was 1.3% by weight, based on the weight of the primary sintered particles 12, 14. The pressure drop across the filter element increased by approximately 55%, Such increase in pressure drop is acceptable, especially in view of the conversion rates obtained, as will be reported below.

The deposit of 1.3% by weight of titania nano particles already provides for an optimum performance of the completed catalytically active porous element. Of course, higher deposits of titania nano particles are possible. If the same size of nano particles is used to achieve a higher loading of the primary sintered structure, a higher pressure drop or a reduced flow rate of the gas phase to be treated will be observed.

Use of smaller titania nano particles will allow higher loadings without an increase in pressure drop.

For the catalyst deposition an aqueous impregnation precursor solution containing 152.2 g deionized water, 2.44 g ammonium meta-vanadate, 14.03 g ammonium meta-tungstate hydrate and 19.7 g oxalic acid dihydrate was prepared and used directly for impregnation which was performed in the same manner as in case of impregnation with the $TiO_2$ nano particle suspension. After the remaining impregnation solution was drained from the interior 16 of the completely wetted tubular filter element 10 after a holding time of 3 sec, in contrast to the drying procedure of the $TiO_2$ impregnation step, the tubular filter element 10 was only partially dried to a mass loss of 35% with respect to the initial mass of loaded catalyst impregnation solution.

After this drying procedure the sample was directly thermally treated by heating up the tubular filter element 10 to 500° C., holding it for 180 min at 500° C. and cooling it down to room temperature in a electrically heated kiln to obtain a tubular catalytically active porous filter element 10 with a vanadic oxide ($V_2O_5$) loading of 0.28% by weight and a tungsten oxide ($WO_3$) loading of 1.9% by weight, based on the weight of the sintered primary particles. The loading of the catalytic component consisted essentially of clusters and/or nano particles 22 of vanadic and tungsten oxide. Given the larger surface area of the titania nano particles most of the catalytic component was deposited on the titania nano particles.

The thus obtained catalytically active porous filter element 10 shows NO conversions by performing a stoichiometric SCR reaction with ammonia ($NO/NH_3$=1:1) as described in Table 1 within a preparation and measurement error of ±10%. The values reported are mean values of two measurements.

TABLE 1

NO conversion of the 50 mm long tubular catalytic filter element 10 as function of the catalyst operation temperature at a selected NO and $NH_3$ inlet concentration and a filtration velocity of 2 cm/s and 3 vol % $O_2$.

| Temperature [° C.] | Filtration velocity [cm/s] | NO inlet [ppmV] | $NH_3$ inlet [ppmV] | NO conversion [%] |
|---|---|---|---|---|
| 280 | 2 | 500 | 500 | 74.7 |
| 300 | 2 | 500 | 500 | 79.4 |
| 320 | 2 | 500 | 500 | 80.5 |
| 340 | 2 | 500 | 500 | 78.7 |

EXAMPLE 2

A catalytically active porous tubular filter element 10 was prepared according to the procedure described in Example 1 with the exception that 161.5 g deionized water, 2.44 g ammonium metavanadate, 7.00 g ammonium metatungstate hydrate, 1.17 g ammonium heptamolybdate tetrahydrate and 14.1 g oxalic acid dehydrate were used for the preparation of a precursor solution for the catalytic component. After partial drying to 48% mass loss with respect to the initial mass of loaded catalyst impregnation solution, a tubular catalytically active filter element 10 was obtained. The thus-prepared catalytic filter element is characterized by a loading of 1.3% $TiO_2$ nano particles, a $V_2O_5$ loading of 0.28% by weight, a $WO_3$ loading of 0.97% by weight and a $MoO_3$ loading of 0.14% by weight, based on the weight of the sintered primary particles.

The corresponding NO conversion rate as function of the temperature in a stoichiometric SCR reaction with ammonia is given in Table 2 with a preparation and measurement error of ±10%. The reported values are mean values of two measurements.

TABLE 2

NO conversion of the 50 mm long tubular catalytic filter element 10 as function of the catalyst operation temperature at 3 vol % $O_2$, 500 ppmV NO inlet concentration and a filtration velocity of 2 cm/s.

| Temperature [° C.] | Filtration velocity [cm/s] | NO inlet [ppmV] | $NH_3$ inlet [ppmV] | NO conversion [%] |
|---|---|---|---|---|
| 260 | 2 | 500 | 500 | 72.0 |
| 300 | 2 | 500 | 500 | 78.7 |
| 320 | 2 | 500 | 500 | 77.3 |
| 340 | 2 | 500 | 500 | 71.1 |

EXAMPLE 3

A tubular catalytic filter element 10 was prepared according to the procedure described in Example 1 while using 157.9 g deionized water, 4.89 g ammonium meta-vanadate, 7.00 g ammonium meta-tungstate hydrate and 17.7 g oxalic acid dehydrate for impregnating the filter element 10 with the catalytic precursor. After partial drying to 71% mass loss with respect to the initial mass of loaded catalyst impregnation solution a catalytically active filter element 10 for VOC removal (volatile organic compound) with a $TiO_2$ loading of 1.3% by weight, a $V_2O_5$ loading of 0.55% by weight and a $WO_3$ loading of 0.96% by weight, based on the weight of the sintered primary particles was obtained. The removal efficiency for naphthalene as volatile organic compound is given in Table 3 with a preparation and measurement error of ±10%. The reported-values are mean values of two measurements.

TABLE 3

Naphthalene conversion of the 50 mm long tubular catalytic filter element 10 as function of the filtration velocity at 340° C., 3 vol % $O_2$ and a naphthalene inlet concentration of 300 ppmV.

| Temperature [° C.] | Filtration velocity [cm/s] | Naphthalene inlet concentration [ppmV] | Naphthalene conversion [%] |
|---|---|---|---|
| 340 | 1 | 300 | 93% |
| 340 | 3 | 300 | 83% |

EXAMPLE 4

A tubular catalytic filter element 10 was prepared according to the procedure described in Example 1 while substituting the V and W catalyst impregnation solution used in Example 1 by a Mn precursor solution containing 1.92 g manganese nitrate tetrahydrate in 187.1 g deionized water. The partial drying procedure is modified by adjusting it to a mass loss of 71% with respect to the initial mass load of Mn impregnation solution. After thermal treatment performed in the same manner as in Example 1 a catalytic filter element 10 with a $TiO_2$ loading of 1.3% by weight and a $MnO_2$ loading of 0.096% by weight, based on the sintered primary particles was obtained.

The tubular catalytic filter element of this Example has been specifically designed for VOC oxidation.

The removal efficiency for propene as volatile organic compound is given in Table 4 with a preparation and measurement error of ±10%.

TABLE 4

Propene conversion of the 50 mm long tubular catalytic filter element 10 as function of the catalyst operation temperature at 300 ppmV propene inlet concentration, 3 vol % $O_2$ and a filtration velocity of 2 cm/s.

| Temperature [° C.] | Filtration velocity [cm/s] | Propene inlet [ppmV] | Propene conversion [%] |
|---|---|---|---|
| 260 | 2 | 300 | 18.6 |
| 300 | 2 | 300 | 42 |
| 320 | 2 | 300 | 56.6 |

EXAMPLE 5

A tubular catalytic filter element 10 was prepared according to the procedure described in Example 1. However, the catalyst precursor solution contained 0.273 g tetramminplatin (II)chlorid monohydrate and 5.269 g oxalic acid dihydrate instead of 14.03 g ammonium meta-tungstate hydrate and 19.7 g oxalic acid dihydrate. After drying the wetted filter element 10 up to a mass loss of 53% relating to the initial mass of the loaded impregnation solution, a catalytically active filter element 10 with a $TiO_2$ loading of 1.3% by weight, a $V_2O_5$ loading of 0.28% by weight and a (elementary) Pt loading of 0.022% by weight, based on the weight of the sintered primary particles, was obtained. By an additional reduction treatment in a flow of 5% $H_2/N_2$ at 400° C. for 5 h, the Pt catalyst was provided in elementary form.

The tubular catalytic filter element of this Example has been designed for VOC removal as well as for combined $NO_x$ and VOC removal.

The removal efficiency for propene as volatile organic compound is given in Table 5 with a preparation and measurement error of ±10%.

TABLE 5

Propene conversion of the 50 mm long tubular catalytic filter element 10 as function of the catalyst operation temperature at 300 ppmV propene inlet concentration, 3 vol % $O_2$ and a filtration velocity of 2 cm/s.

| Temperature [° C.] | Filtration velocity [cm/s] | Propene inlet [ppmV] | Propene conversion [%] |
|---|---|---|---|
| 260 | 2 | 300 | 95.6 |
| 280 | 2 | 300 | 96.0 |
| 300 | 2 | 300 | 96.5 |
| 320 | 2 | 300 | 96.3 |

The removal efficiency for combined removal of $NO_X$ and propene as volatile organic compound is given in Table 6 with a preparation and measurement error of ±10%.

TABLE 6

Simultaneous NO and propene conversions of the 50 mm long tubular catalytic filter element 10 as function of the catalyst operation temperature at 500 ppmV NO, 500 ppmV $NH_3$, 300 ppmV propene inlet concentration. 3 vol % $O_2$ and a filtration velocity of 2 cm/s.

| Temperature [° C.] | Filtration velocity [cm/s] | Propene inlet [ppmV] | NO inlet [ppmV] | $NH_3$ Inlet [ppmV] | Propene conversion [%] | NO conversion [° C.] |
|---|---|---|---|---|---|---|
| 300 | 2 | 300 | 500 | 500 | 50.9 | 67.7 |
| 320 | 2 | 300 | 500 | 500 | 89.3 | 58.1 |

EXAMPLE 6

In this Example, a catalytically active porous element 60 (cf. the schematic representation of FIG. 3) based on a porous structural element of sintered ceramic primary particles was manufactured. The porous structural element consisted of SiC grains 62 as primary particles. The average particle size of the SiC grains 62 was 160 μm. These primary particles were sintered to form a tubular structure with an outer diameter of 60 mm, an inner diameter of 40 mm and a length of 50 mm.

The outer surface of the tubular element was used as the upstream surface and was provided with a membrane filter layer 63. This filter layer 63 had a thickness of approximately 200 μm on average and consisted of sintered mullite particles 64 of an average particle size of 40 mm. The pore size of the filter layer 63 was approximately 10 μm.

Such porous structural elements are commercially available as DIA-SCHUMALITH 10-20 from PALL Schumacher GmbH, Germany.

Subsequently, the membrane filter layer 63 was provided with a protective layer of commercially available paraffin wax with a melting point of 51 to 53° C. as described in Example 1.

In a first step the porous structural element 60 was impregnated with a $TiO_2$ nano particle suspension as described in Example 1. Use was made of the device of FIG. 2 and the porous structural element 60 was placed on the rubber hopper 40 with one of its open ends. The interior space 66 of element 60 was filled with the titania nano particle suspension until the level rose up to the upper (open) end 68 of element 60.

Due to the difference in the sintered primary particle structure, a titania nano particle loading of 0.92% by weight was obtained. The increase in pressure drop due to the loading of titania nano particles amounted to 53%.

Thereafter, the catalytic component was deposited using the starting materials described in Example 1.

After thoroughly wetting the porous element with the catalytic component precursor solution, the porous element was completely dried (in contrast to the partial drying in Example 1).

Thereafter, the thermal treatment described in Example 1 was performed, thereby removing the protective layer from the filter layer.

The catalytically active porous filter element had a loading of 0.15% by weight of vanadic oxide and 1.06% by weight of tungsten oxide, each based on the weight of the sintered primary particles.

The filter element showed NO conversion as reported in Table 7 under conditions of a stoichiometric SCR reaction with ammonia. The preparation and measurement error was ±10%. The values reported are mean values obtained in two measurements.

TABLE 7

NO conversion of the 50 mm long tubular catalytic filter element 60 as function of the catalyst operation temperature at 3 vol % $O_2$, 500 ppmV NO inlet concentration and a filtration velocity of 2 cm/s.

| Temperature [° C.] | Filtration velocity [cm/s] | NO inlet [ppmV] | $NH_3$ inlet [ppmV] | NO conversion [%] |
|---|---|---|---|---|
| 260 | 2 | 500 | 500 | 58.5 |
| 280 | 2 | 500 | 500 | 69 |
| 300 | 2 | 500 | 500 | 75.5 |

Although in the foregoing Examples 1 to 6 the invention was described in connection with catalytically active porous elements carrying on the upstream surface a filter layer, it is easily understood that comparable results for NOx removal and VOC oxidation will be obtained with catalytically active porous elements where the filter layer is missing. The filter layer merely served to protect the porous element from impinging particles possibly contained in the gas phase to be treated but did not take part in the catalytic reactions.

The invention claimed is:

1. A catalytically active porous element for promoting catalytic gas phase reactions, said element comprising:
a porous structural element of sintered ceramic or metallic primary particles, which are selected from fibrous and/or granular particles, the granular primary particles having an average size of from 40 to 400 μm and the fibrous primary particles having an average diameter of from 10 to 400 μm and an average length of from 1 to 20 mm; a secondary structure of titania nano particles deposited on the surface of said sintered primary particles and a catalytic component deposited on the surface of the titania nano particles.

2. The porous element according to claim 1, wherein said porous structural element comprises an upstream and a downstream surface, said upstream surface carrying a filter layer.

3. The porous element according to claim 2, wherein said filter layer is essentially free from titania nano particles.

4. The porous element according to claim 1, wherein the amount of titania nano particles deposited on said sintered primary particles ranges from 0.1 to 20% by weight, based on the weight of the sintered primary particles.

5. The porous element according to claim 4, wherein the porous structural element is essentially comprised of sintered granular primary particles, and wherein the amount of titania nano particles ranges from 0.1 to 10% by weight, based on the weight of the sintered primary particles.

6. The porous element according to claim 4, wherein the porous structural element is essentially comprised of sintered granular and fibrous primary particles, and wherein the amount of titania nano particles ranges from 0.1 to 15% by weight, based on the weight of the sintered primary particles.

7. The porous element according to claim 4, wherein the porous structural element is essentially comprised of sintered fibrous primary particles, and wherein the amount of titania nano particles ranges from 0.1 to 20% by weight, based on the weight of the sintered primary particles.

8. The porous element according to claim 1, wherein the catalytic component comprises vanadic oxide clusters and/or nano particles.

9. The porous element according to claim 8, wherein the amount of vanadic oxide clusters and/or nano particles ranges from 0.01 to 10% by weight, based on the weight of the sintered primary particles.

10. The porous element according to claim 8, wherein the average size of the vanadic oxide nano particles ranges from 1 nm up to one half of the average particle size of the titania nano particles.

11. The porous element according to claim 1, wherein the catalytic component comprises manganese oxide clusters and/or nano particles.

12. The porous element according to claim 11, wherein the amount of manganese oxide clusters and/or nano particles ranges from 0.001 to 6% by weight, based on the weight of the sintered primary particles.

13. The porous element according to claim 11, wherein the average size of the manganese oxide nano particles ranges from 1 nm up to one half of the average particle size of the titania nano particles.

14. The porous element according to claim 8, wherein the catalytic component comprises in addition to vanadic oxide clusters and/or nano particles, clusters and/or nano particles of tungsten oxide and/or molybdenum oxide.

15. The porous element according to claim 14, wherein the amount of tungsten and molybdenum oxide clusters and/or nano particles ranges independently of one another from 0.05 to 20% by weight, based on the weight of the sintered primary particles.

16. The porous element according to claim 6, wherein the amount of granular particles ranges from 40 to 90% by weight and the amount of fibrous primary particles ranges from 10 to 60% by weight, based on the weight of the total amount of primary particles.

17. The porous element according to claim 1, wherein the titania nano particles and/or the clusters and/or particles of the catalytic component are bonded to the primary particles and/or the titania nano particles, respectively, by a thermal or sintering process.

18. The porous element according to claim 2, wherein the filter layer is a filter membrane made of ceramic or metallic particles, said filter membrane having a smaller pore size than the structural element of sintered primary particles.

19. The porous element according to claim 1, wherein said element has an essentially tubular structure.

20. The element of claim 1, having a NOx removal efficiency of over 70% at a NOx feed concentration of 500 ppm and a temperature of 300° C.

21. A method of removing NOx from a gas stream comprising placing the gas stream in contact with the catalytically active porous element of claim 1, and removing the NOx by selective catalytic reduction of the NOx.

22. A method of removing volatile organic compounds (VOC) from a gas stream comprising placing the gas stream in contact with the catalytically active porous element of claim 1, and removing VOC by catalytic oxidation.

23. A method of simultaneously removing NOx and volatile organic compounds (VOC) from a gas stream comprising placing the gas stream in contact with the catalytically active porous element of claim 1, and simultaneously removing NOx and VOC by catalytic conversion.

24. A method for manufacturing a porous element according to claim 3, comprising:
providing a porous element having a filter layer on the upstream surface of the structural element;
impregnating and coating the filter layer with a removable protecting agent, thereby forming a protective layer blocking the pores of the filter layer;
depositing titania nano particles on the sintered primary particles of the structural element;
depositing the catalytic component on the surface of the titania nano particles; and
removing the protecting agent from the filter layer.

25. The method according to claim 24, wherein depositing the catalytic component comprises impregnating the structural element having titania nano particle deposited on the surface of the sintered primary particles with a solution of a precursor of the catalytic component, a sol or a suspension comprising catalytic clusters and/or nano particles, drying and thermally treating the impregnated structural element, thereby removing solvent of the precursor solution, the sol or the suspension and removing the protecting agent by evaporating and/or burning the same.

26. The method according to claim 24, wherein depositing titania nano particles includes drying the porous element under conditions which leave the protective layer unaffected.

27. The method according to claim 24, wherein depositing the catalytic component includes partially drying the porous element prior to removal of the protective layer and a final thermal treatment step.

* * * * *